United States Patent
Jiang et al.

(10) Patent No.: US 12,170,987 B2
(45) Date of Patent: Dec. 17, 2024

(54) METHOD AND DEVICE IN A NODE USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 705 days.

(21) Appl. No.: 17/371,070

(22) Filed: Jul. 8, 2021

(65) Prior Publication Data
US 2021/0345333 A1 Nov. 4, 2021

Related U.S. Application Data

(63) Continuation of application No. PCT/CN2021/072405, filed on Jan. 18, 2021.

Foreign Application Priority Data

Jan. 21, 2020 (CN) .......................... 202010069306.8

(51) Int. Cl.
*H04W 72/0453* (2023.01)
*H04L 5/00* (2006.01)
(Continued)

(52) U.S. Cl.
CPC ......... *H04W 72/0453* (2013.01); *H04L 5/001* (2013.01); *H04W 72/0446* (2013.01); *H04W 16/14* (2013.01)

(58) Field of Classification Search
CPC ............................ H04L 1/1861; H04W 72/20
See application file for complete search history.

(56) References Cited

U.S. PATENT DOCUMENTS

| 5,862,451 A | 1/1999 | Grau et al. |
| 2011/0063130 A1 | 3/2011 | Ozaki et al. |

(Continued)

FOREIGN PATENT DOCUMENTS

| CN | 102368871 A | 3/2012 |
| CN | 104012023 A | 8/2014 |

(Continued)

OTHER PUBLICATIONS

First Office Action received in application No. EP21700144.5 dated Jan. 19, 2024.
(Continued)

*Primary Examiner* — Yee F Lam

(57) ABSTRACT

The present disclosure provides a method and device in a node for wireless communications. A first node first receives first information, the first information being used for determining a target carrier; then detects a first signaling in a first candidate resource set; and when the first signaling is detected, operates a first signal in a first carrier, and the first signaling is used for determining time-frequency resources occupied by the first signal; the first signaling carries a first identifier, and the first identifier is used for identifying the first carrier; the first candidate resource set comprises a positive integer number of candidate resource group(s), and the first signaling occupies a candidate resource group in the first candidate resource set. The present disclosure configures different Carrier Indicator Fields (CIFs) for the first carrier to optimize the mode of blind detection, thus improving performance of the system.

18 Claims, 9 Drawing Sheets

(51) Int. Cl.
   *H04W 16/14* (2009.01)
   *H04W 72/0446* (2023.01)

(56) References Cited

U.S. PATENT DOCUMENTS

| | | | |
|---|---|---|---|
| 2011/0064115 A1* | 3/2011 | Xu | H04L 1/1671 375/E1.001 |
| 2012/0083284 A1* | 4/2012 | Harrison | H04L 1/1692 455/450 |
| 2018/0331811 A1 | 11/2018 | McBeath et al. | |
| 2018/0367283 A1* | 12/2018 | Huang | H04L 1/1812 |
| 2019/0081763 A1* | 3/2019 | Akkarakaran | H04L 1/0026 |
| 2019/0098605 A1* | 3/2019 | Seo | H04L 5/0091 |
| 2019/0357184 A1 | 11/2019 | Tang et al. | |

FOREIGN PATENT DOCUMENTS

| | | |
|---|---|---|
| CN | 106301674 A | 1/2017 |
| EP | 3490334 A1 | 5/2019 |
| EP | 3509375 A1 | 7/2019 |
| WO | 2019084926 A1 | 5/2019 |

OTHER PUBLICATIONS

ISR in application PCT/CN2021/072405 dated Apr. 26, 2021.
CN202010069306.8 First Office Action dated Mar. 31, 2022.
CN202010069306.8 First Search Report dated Mar. 27, 2022.
"R1-1907331 Cross-carrier scheduling with different numerologies" 3GPP TSG RAN WG1_RL1 May 3, 2019.

* cited by examiner

```
CrossCarrierSchedulingConfig:: = SEQUENCE{
    SchedulingCellInfo   CHOICE{
        Own            SEQUENCE{
          Cif-Presence      BOOLEAN
        },
        Other    SEQUENCE{
            SchedulingCellId       ServCellIndex,
            cif-InSchedulingCell   INTEGER (1..7)
            cif-searchspace1       INTEGER (1..7)
            ControlResourceSetId   ControlResourceSetId-A
            cif-searchspace2       INTEGER (1..7)
            ControlResourceSetId   ControlResourceSetId-B
        },
    },
```

METHOD AND DEVICE IN A NODE USED FOR WIRELESS COMMUNICATION

CROSS REFERENCE TO RELATED APPLICATIONS

This application is a continuation of International Application No. PCT/CN2021/072405, filed Jan. 18, 2021, claims the priority benefit of Chinese Patent Application No. 202010069306.8, filed on Jan. 21, 2020, the full disclosure of which is incorporated herein by reference.

BACKGROUND

Technical Field

The present disclosure relates to transmission methods and devices in wireless communication systems, and in particular to a transmission method and device in Cross-Carrier Scheduling in wireless communications.

Related Art

Application scenarios of future wireless communication systems are becoming increasingly diversified, and different application scenarios have different performance demands on systems. In traditional Long-Term Evolution (LTE) and Long-Term Evolution Advanced (LTE-A) systems, for the purpose of increasing transmission bandwidths and capacity of Physical Downlink Control Channels (PDCCHs), Carrier Aggregation (CA) technology has been introduced. In this way, one carrier is scheduled to be capable of scheduling another carrier through the mode of Cross-Carrier Scheduling with taking system stability and realizability into consideration. Besides, a Primary Cell (PCell) can only be self-scheduled.

In 5G and evolution of subsequent Release 17, Dynamic Spectrum Sharing (DSS) technology has achieved a sharing between the LTE and 5G spectrums; therefore, when a PCell and a Secondary Cell (SCell) of a terminal are respectively an NR carrier and an LTE carrier, the NR carrier can be scheduled by the LTE carrier. A research on DSS-related technology was decided to be conducted at Radio Access Network (RAN) #86 plenary, and standard work has been started.

SUMMARY

In DSS project, there will exist a scenario of an SCell scheduling a PCell. While in traditional CA, a PCell, as a primary cell of a terminal, needs highest robustness, so when a blind detection is performed on scheduling of the PCell, positions of corresponding PDCCH candidates should be with better performance. At the same time, if an SCell is capable of scheduling a PCell, obviously the performance of the SCell itself is better. In view of the above problem, the way how to configure positions of PDCCH candidates targeted at different cells on a same time-frequency resource needs to be redesigned.

In view of the above new scenario in DSS, the present disclosure provides a solution. It should be noted that though the present disclosure only took the DSS scenario for example in the statement above, it is also applicable to other scenarios such as unlicensed frequency spectrum where similar technical effect can be achieved; similarly, the present disclosure is also applicable to scenarios existing a cellular network or IoT devices to achieve similar technical effects; additionally, the adoption of a unified solution for various scenarios contributes to the reduction of hardware complexity and costs.

In view of the above problem, the present disclosure provides a solution. It should be noted that the embodiments of a first node in the present disclosure and the characteristics of the embodiments may be applied to a second node if no conflict is incurred, and vice versa. Further, the embodiments and the characteristics of the embodiments in the present disclosure may be mutually combined if no conflict is incurred.

The present disclosure provides a method in a first node for wireless communications, comprising:
  receiving first information, the first information being used for determining a target carrier;
  detecting a first signaling in a first candidate resource set; and
  when the first signaling is detected, receiving a first signal in a first carrier, and the first signaling being used for determining time-frequency resources occupied by the first signal in the first carrier;
  herein, the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

The present disclosure provides a method in a first node for wireless communications, comprising:
  receiving first information, the first information being used for determining a target carrier;
  detecting a first signaling in a first candidate resource set; and
  when the first signaling is detected, transmitting a first signal in a first carrier, and the first signaling being used for determining time-frequency resources occupied by the first signal in the first carrier;
  herein, the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the above method is advantageous in that: when an SCell can schedule a PCell as well as itself, a connection between positions of PDCCH candidates that schedule a data channel on a PCell and a position of a time-frequency resource where the PDCCH candidates are located is established to ensure that the positions of the PDCCH candidates are flexibly configured.

In one embodiment, the above method is also advantageous in that: positions of PDCCH candidates when a value of Carrier Indicator Field (CIF) is equal to 0 can be employed by PDCCH candidates scheduling a PCell and PDCCH candidates scheduling an SCell simultaneously, which is staggered by time-frequency resources to ensure that no ambiguity is incurred at the first node side.

In one embodiment, the above method is also advantageous in that: an SCell that can schedule a PCell is defined as a first SCell, and scheduling performed on the first SCell still needs to ensure its robustness; based on this, a base station can achieve that positions of PDCCH candidates when a CIF value is equal to 0 are employed in scheduling performed on both the PCell and the first SCell through the mode of Time-Division Duplex (TDM).

According to one aspect of the present disclosure, comprising:
receiving second information;
herein, the second information is used for indicating a first integer and a second integer; the first integer and the second integer are respectively associated with the first time-frequency-resource pool and the second time-frequency-resource pool.

In one embodiment, the above method is advantageous in that: the first integer and the second integer are configured for the first carrier, the first integer is employed in the first time-frequency-resource pool, and the second integer is employed in the second time-frequency-resource pool; so that the CIF value employed in blind detection performed on a PDCCH varies with time-frequency resources, which is more flexible.

According to one aspect of the present disclosure, the target carrier is a Secondary Component Carrier (SCC), and the target carrier can be used for scheduling a Primary Component Carrier (PCC).

According to one aspect of the present disclosure, time-frequency resources occupied by the first time-frequency-resource pool and time-frequency resources occupied by the second time-frequency-resource pool are orthogonal.

In one embodiment, the above method is advantageous in that: a CIF value employed by the first node for blind detection performed on a PDCCH at a given time is ensured to be determined though the mode of TDM.

According to one aspect of the present disclosure, the second information and the first information belong to two different fields in one signaling.

According to one aspect of the present disclosure, frequency-domain resources occupied by a signal carrying the first information belong to a second carrier, the first information is used for determining a first index, the first index being an index of the target carrier, the first information is used for determining that the target carrier is different from the second carrier, and the target carrier cross-carrier schedules the second carrier.

In one embodiment, the above method is characterized in that: the first information is still transmitted on a PCell to guarantee the transmission quality.

According to one aspect of the present disclosure, comprising:
receiving third information;
herein, the third information is used for determining the target time-frequency-resource pool and a number of candidate resource group(s) comprised in the first candidate resource set.

The present disclosure provides a method in a second node for wireless communications, comprising:
transmitting first information, the first information being used for determining a target carrier;
transmitting a first signaling in a first candidate resource set; and
transmitting a first signal in a first carrier, and the first signaling being used for determining time-frequency resources occupied by the first signal in the first carrier;
herein, the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

The present disclosure provides a method in a second node for wireless communications, comprising:
transmitting first information, the first information being used for determining a target carrier;
transmitting a first signaling in a first candidate resource set; and
receiving a first signal in a first carrier, and the first signaling being used for determining time-frequency resources occupied by the first signal in the first carrier;
herein, the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

According to one aspect of the present disclosure, comprising:
transmitting second information;
herein, the second information is used for indicating a first integer and a second integer; the first integer and the second integer are respectively associated with the first time-frequency-resource pool and the second time-frequency-resource pool.

According to one aspect of the present disclosure, the target carrier is an SCC, and the target carrier can be used for scheduling a PCC.

According to one aspect of the present disclosure, time-frequency resources occupied by the first time-frequency-resource pool and time-frequency resources occupied by the second time-frequency-resource pool are orthogonal.

According to one aspect of the present disclosure, the second information and the first information belong to two different fields in one signaling.

According to one aspect of the present disclosure, frequency-domain resources occupied by a signal carrying the first information belong to a second carrier, the first information is used for determining a first index, the first index being an index of the target carrier, the first information is used for determining that the target carrier is different from the second carrier, and the target carrier cross-carrier schedules the second carrier.

According to one aspect of the present disclosure, comprising:
transmitting third information;
herein, the third information is used for determining the target time-frequency-resource pool and a number of candidate resource group(s) comprised in the first candidate resource set.

The present disclosure provides a first node for wireless communications, comprising:
a first receiver, receiving first information, the first information being used for determining a target carrier;
a second receiver, detecting a first signaling in a first candidate resource set; and
a first transceiver, when the first signaling is detected, receiving a first signal in a first carrier, and the first signaling being used for determining time-frequency resources occupied by the first signal in the first carrier;
herein, the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

The present disclosure provides a first node for wireless communications, comprising:
a first receiver, receiving first information, the first information being used for determining a target carrier;
a second receiver, detecting a first signaling in a first candidate resource set; and
a first transceiver, when the first signaling is detected, transmitting a first signal in a first carrier, and the first signaling being used for determining time-frequency resources occupied by the first signal in the first carrier;
herein, the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

The present disclosure provides a second node for wireless communications, comprising:
a first transmitter, transmitting first information, the first information being used for determining a target carrier;
a second transmitter, transmitting a first signaling in a first candidate resource set;
a second transceiver, transmitting a first signal in a first carrier, and the first signaling being used for determining time-frequency resources occupied by the first signal in the first carrier;
herein, the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

The present disclosure provides a second node for wireless communications, comprising:

a first transmitter, transmitting first information, the first information being used for determining a target carrier;

a second transmitter, transmitting a first signaling in a first candidate resource set;

a second transceiver, receiving a first signal in a first carrier, and the first signaling being used for determining time-frequency resources occupied by the first signal in the first carrier;

herein, the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the present disclosure has the following advantages over conventional schemes:

when an SCell can schedule a PCell as well as itself, a connection between positions of PDCCH candidates that schedule a data channel on a PCell and a position of a time-frequency resource where the PDCCH candidates are located is established to ensure that the positions of the PDCCH candidates are flexibly configured.

positions of PDCCH candidates when a CIF value is equal to 0 can be employed by PDCCH candidates that schedule a PCell and PDCCH candidates that schedule an SCell simultaneously, which is staggered by time-frequency resources to ensure that no ambiguity is incurred at the first node side.

an SCell that can schedule a PCell is defined as a first SCell, and scheduling performed on the first SCell still needs to ensure its robustness; based on this, a base station can achieve that positions of PDCCH candidates when a CIF value is equal to 0 are employed in scheduling performed on both the PCell and the first SCell through the mode of TDM.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is incurred.

Embodiment 1

Figure 1:
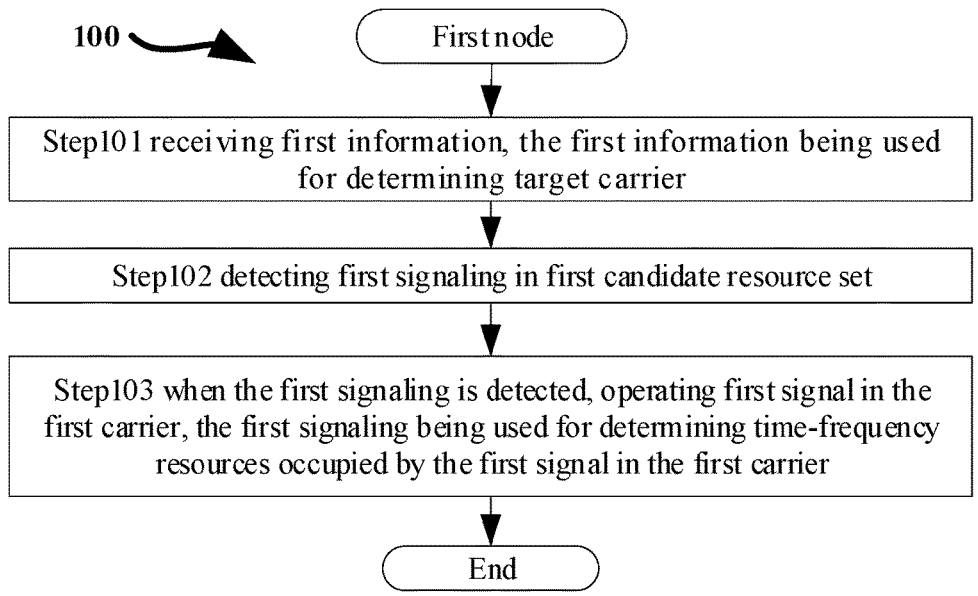
FIG. 1 illustrates a flowchart of the processing of a first node according to one embodiment of the present disclosure.

Embodiment 1 illustrates a processing flowchart of a first node, as shown in FIG. 1. In step 100 illustrated by FIG. 1, each box represents a step. In Embodiment 1, a first node in the present disclosure receives first information in step S101, the first information being used for determining a target carrier; detects a first signaling in a first candidate resource set; when the first signaling is detected in step 103, operates a first signal in a first carrier, and the first signaling is used for determining time-frequency resources occupied by the first signal in the first carrier.

In Embodiment 1, the operating action is receiving, or, the operating action is transmitting; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the phrase that the operating action is receiving, or the operating action is transmitting comprises that: the operating action is one of receiving or transmitting.

In one embodiment, the phrase that the operating action is receiving, or the operating action is transmitting comprises that: the first signal can be transmitted through a Downlink channel or an Uplink channel.

In one embodiment, when the first signaling is detected by the first node, the first node receives the first signal in the first carrier, and the first signaling is used for determining time-frequency resources occupied by the first signal in the first carrier.

In one embodiment, when the first signaling is detected by the first node, the first node transmits the first signal in the first carrier, and the first signaling is used for determining time-frequency resources occupied by the first signal in the first carrier.

In one embodiment, the first signaling indicates a time-frequency position of the first signal in the first carrier.

In one embodiment, the first information is carried by a Radio Resource Control (RRC) signaling.

In one embodiment, the first information is carried by a higher-layer signaling.

In one embodiment, an Information Element carrying the first information is CrossCarrierSchedulingConfig in TS 38.331.

In one subembodiment of the above embodiment, the first information corresponds to a schedulingCellId part in the CrossCarrierSchedulingConfig.

In one embodiment, the phrase that the first information is used for determining a target carrier comprises that: the first information is used for determining that the target carrier can be used for scheduling the first carrier.

In one embodiment, the phrase that the first information is used for determining a target carrier comprises that: the first information is used for determining a CIF value indicating the target carrier employed in a scheduling signaling when the target carrier is cross-scheduled by other carriers.

In one embodiment, the phrase that the first information is used for determining a target carrier comprises that: the first information is used for determining a CIF value employed when the target carrier is scheduled by the target carrier.

In one embodiment, the target carrier is an SCC.

In one embodiment, a carrier occupied by an SCell of the first node is the target carrier.

In one embodiment, the target carrier corresponds to an SCell of the first node.

In one embodiment, a ServCellIndex employed by the target carrier is greater than 0.

In one embodiment, a ServCellId employed by the target carrier is greater than 0.

In one embodiment, the target carrier is a PCell, and the first carrier is an SCell.

In one embodiment, a ServCellID corresponding to the target carrier is equal to 0, and a ServCellID corresponding to the first carrier is greater than 0.

In one embodiment, the first candidate resource set comprises a positive integer number of Resource Elements (REs).

In one embodiment, the first candidate resource set comprises a positive integer number of PDCCH Candidate(s).

In one embodiment, the first candidate resource set is a PDCCH Search Space Set.

In one embodiment, the detection comprises blind detection.

In one embodiment, the detection comprises energy detection.

In one embodiment, the detection comprises sequence detection.

In one embodiment, the detection comprises a reception.

In one embodiment, the detection comprises decoding.

In one embodiment, a physical layer channel carrying the first signaling is a PDCCH.

In one embodiment, the first signaling is a dynamic signaling.

In one embodiment, the first signaling is a scheduling signaling.

In one embodiment, before receiving the first signaling, the first node does not know which RE(s) in the first candidate set occupied by the first signaling.

In one embodiment, the operating action is receiving, a physical layer channel carrying the first signal is a Physical Downlink Shared Channel (PDSCH).

In one embodiment, the operating action is transmitting, a physical layer channel carrying the first signal is a Physical Uplink Shared Channel (PUSCH).

In one embodiment, the first signaling is a DL Grant, and the operating action is receiving.

In one embodiment, the first signaling is a UL Grant, and the operating action is transmitting.

In one embodiment, the phrase that the first signaling is detected comprises that: a Cyclic Redundancy Check (CRC) carried by the first signaling is passed.

In one embodiment, a CRC carried by the first signaling is scrambled by a Cell Radio Network Temporary Identifier (C-RNTI) of the first node.

In one embodiment, the above phrase that the first signaling is used for determining time-frequency resources occupied by the first signal in the first carrier comprises that: the first signaling indicates a first time-frequency resource set, and frequency-domain resources occupied by the first time-frequency resource set belong to the first carrier.

In one embodiment, the above phrase that the first signaling is used for determining time-frequency resources occupied by the first signal in the first carrier comprises that: the first signaling indicates that the first node receives the first signal in the first carrier via the first identifier.

In one embodiment, the above phrase that the first signaling is used for determining time-frequency resources occupied by the first signal in the first carrier comprises that: the first signaling indicates that the first node transmits the first signal in the first carrier via the first identifier.

In one embodiment, the first identifier is a non-negative integer indicated by a CIF in the first signaling.

In one embodiment, the first identifier is a positive integer.

In one embodiment, the first identifier is a non-negative integer.

In one embodiment, the first identifier is a value of a CIF carried by the first signaling.

In one embodiment, the above phrase that the first identifier is used for identifying the first carrier comprises that: the first identifier is used for identifying the first carrier out of a candidate carrier set, and the candidate carrier set comprises Q1 carrier(s).

In one subembodiment of the above embodiment, Q1 is a positive integer no greater than 8.

In one subembodiment of the above embodiment, Q1 is equal to 8.

In one embodiment, the first carrier is a PCC.

In one embodiment, a carrier occupied by a PCell of the first node is the first carrier.

In one embodiment, the first carrier corresponds to a PCell of the first node.

In one embodiment, a ServCellIndex employed by the first carrier is equal to 0.

In one embodiment, a ServCellId employed by the first carrier is equal to 0.

In one embodiment, the first candidate resource set comprises K1 candidate resource groups, K1 being a positive integer, and the K1 candidate resource groups respectively correspond to K1 PDCCH candidates.

In one embodiment, the target time-frequency-resource pool is a Control Resource Set (CORESET).

In one embodiment, any candidate resource group in the first candidate resource set comprises a positive integer number of RE(s).

In one embodiment, the first candidate resource set comprises K1 candidate resource groups, and positions of the K1 candidate resource groups in the target time-frequency-resource pool are related to the target identifier.

In one embodiment, the above phrase that whether the target time-frequency-resource pool is the same as the first time-frequency-resource pool is used for determining the target identifier out of a first integer and a second integer comprises that: the target time-frequency-resource pool is the same as the first time-frequency-resource pool, the target identifier is equal to the first integer; or the target time-frequency-resource pool is the same as the second time-frequency-resource pool, the target identifier is equal to the second integer.

In one subembodiment of the above embodiment, the first integer is equal to 0, and the second integer is greater than 0.

In one subembodiment of the above embodiment, when the first carrier is equal to the target carrier, the first integer is equal to 0, and the second integer is greater than 0.

In one subembodiment of the above embodiment, when the first carrier is equal to the target carrier, the first integer is equal to 0, and the second integer is equal to 1.

In one subembodiment of the above embodiment, when the first carrier is equal to the target carrier, the first integer is equal to 0, and the second integer is equal to a ServCellIndex of the target carrier.

In one subembodiment of the above embodiment, when the first carrier is equal to the target carrier, the first integer is equal to 0, and the second integer is equal to a ServCellId of the target carrier.

In one embodiment, the first time-frequency-resource pool is a CORESET.

In one embodiment, the second time-frequency-resource pool is a CORESET.

In one embodiment, any candidate resource group in a positive integer number of candidate resource group(s) comprised in the first candidate resource set is a PDCCH candidate.

In one embodiment, any candidate resource group in a positive integer number of candidate resource group(s) comprised in the first candidate resource set consists of a positive integer number of Control Channel Element(s).

In one embodiment, the phrase that the target identifier is used for determining the first candidate resource set out of the target time-frequency-resource pool comprises that: the first candidate resource set comprises K1 candidate resource groups, any of the K1 candidate resource groups occupies a positive integer number of CCE(s), and the target identifier is used for determining position(s) of a positive integer number of CCE(s) occupied by any of the K1 candidate resource groups out of the target time-frequency-resource pool.

In one subembodiment of the above embodiment, a relation between the target identifier and position(s) of a positive integer number of CCE(s) occupied by any of the K1 candidate resource groups is determined by the following formula:

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i$$

Herein, $m_{s,n_{CI}}$ is used for identifying one of the K1 candidate resource groups, and the above formula is used for calculating an index of a CCE with an aggregation level of L comprised in a candidate resource group marked by $m_{s,n_{CI}}$; s represents the target time-frequency-resource pool, the target time-frequency-resource pool is associated with a control signaling set (CORESET) p, $n_{s,f}^\mu$ represents an index of a slot to which time-domain resources comprised in the first candidate resource set belong, $n_{CI}$ represents a value of the target identifier, and $Y_{p,n_{s,f}^\mu}$ represents a non-negative integer related to the first node identifier in the present disclosure; i is an integer no less than 0 and less than L, $N_{CCE,p}$ represents a number of CCE(s) in a control signaling set p, CCE(s) in the control signaling set is(are) indexed from 0 to $N_{CCE,p}-1$, $m_{s,n_{CI}}$ is a non-negative integer no less than 0 and less than $M_{s,n_{CI}}^{(L)}$, $M_{s,n_{CI}}^{(L)}$ represents a number of PDCCH candidate(s) with aggregation level(s) of L configured for the first carrier in the target time-frequency-resource pool s; $M_{s,max}^{(L)}$ represents a maximum value of $M_{s,n_{CI}}^{(L)}$ with an aggregation level of L and configured with $n_{CI}$ in the target time-frequency-resource pool s.

Embodiment 2

Figure 2:
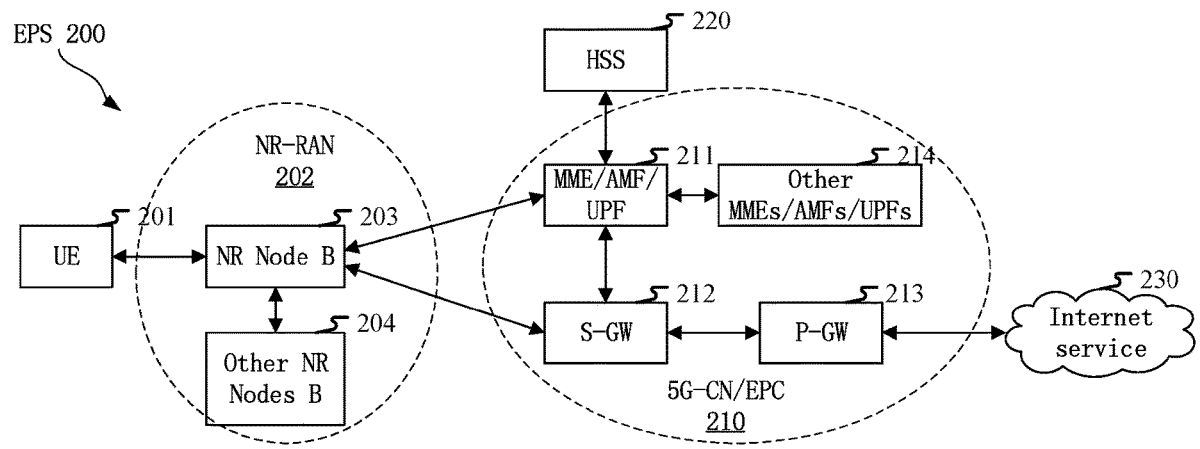
FIG. 2 illustrates a schematic diagram of a network architecture according to one embodiment of the present disclosure.

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 is a terminal that supports Cross-Carrier Scheduling.

In one embodiment, the UE 201 can be scheduled simultaneously in multiple carriers.

In one embodiment, the gNB 203 corresponds to the second node in the present disclosure.

In one embodiment, the gNB 203 supports Cross-Carrier Scheduling.

In one embodiment, the gNB 203 can schedule a terminal simultaneously in multiple carriers.

In one embodiment, an air interface between the UE 201 and the gNB 203 is a Uu interface.

In one embodiment, a radio link between the UE 201 and the gNB 203 is a cellular link.

Embodiment 3

Figure 3:
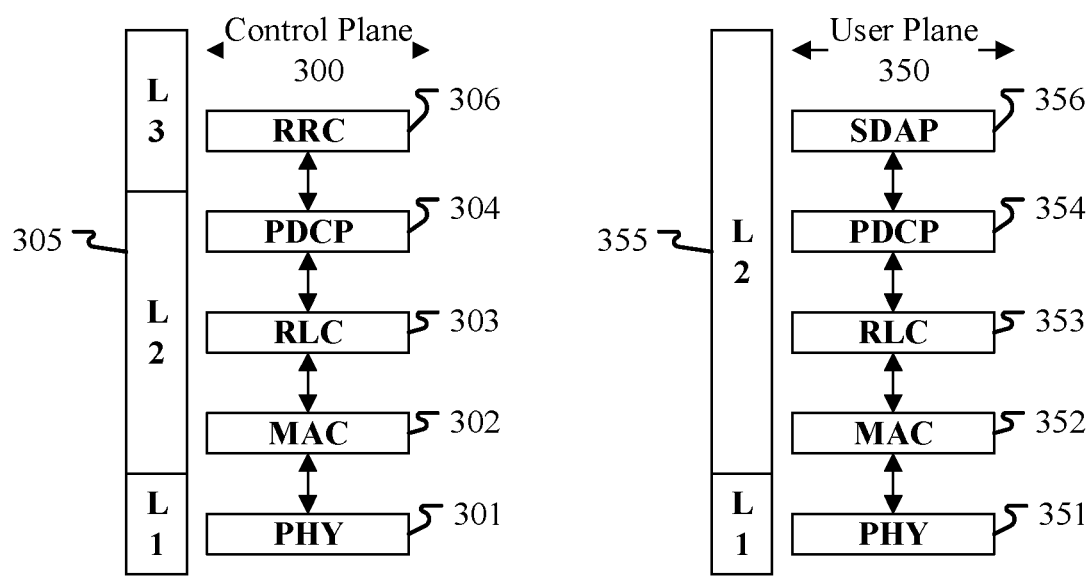
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, a RSU in gNB or V2X) and a second communication node (gNB, a RSU in UE or V2X) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and also provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP 304 of the second communication node is used for generating scheduling of the first communication node.

In one embodiment, the PDCP 354 of the second communication node is used for generating scheduling of the first communication node.

In one embodiment, the first information is generated by the MAC 352 or the MAC 302.

In one embodiment, the first information is generated by the RRC 306.

In one embodiment, the first signaling is generated by the PHY 301 or the PHY 351.

In one embodiment, the first signaling is generated by the MAC 352 or the MAC 302.

In one embodiment, the first signal is generated by the RRC 306.

In one embodiment, the first signal is generated by the PHY 301 or the PHY 351.

In one embodiment, the first signal is generated by the MAC 352 or the MAC 302.

In one embodiment, the second information is generated by the MAC 352 or the MAC 302.

In one embodiment, the second information is generated by the RRC 306.

In one embodiment, the third information is generated by the MAC 352 or the MAC 302.

In one embodiment, the third information is generated by the RRC 306.

Embodiment 4

Figure 4:
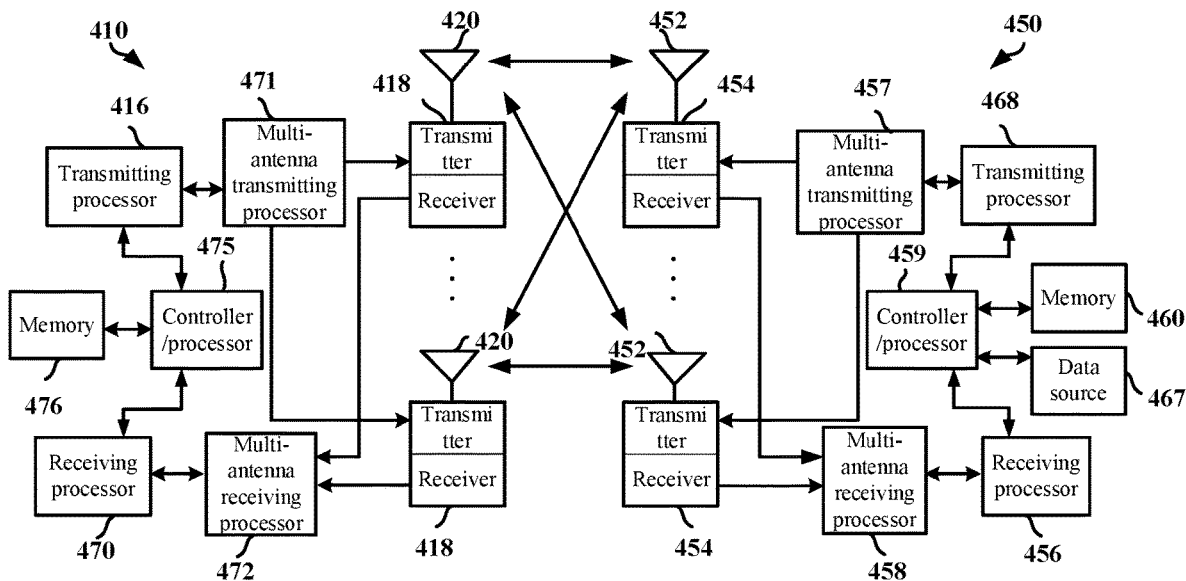
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a sub-carrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multi-carrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multi-carrier symbol stream from the receiver 454. The receiving processor 456 converts the baseband multi-carrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multi-carrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least: receives first information, the first information being used for determining a target carrier; detects a first signaling in a first candidate resource set; and when the first signaling is detected, receives a first signal in a first carrier, and the first signaling is used for determining time-frequency resources occupied by the first signal in the first carrier; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are non-negative integers.

In one embodiment, the first communication device 450 comprises at least one processor and at least one memory. The at least one memory comprises computer program codes; the at least one memory and the computer program codes are configured to be used in collaboration with the at least one processor, the first communication device 450 at least: receives first information, the first information being used for determining a target carrier; detects a first signaling in a first candidate resource set; and when the first signaling is detected, transmits a first signal in a first carrier, and the first signaling is used for determining time-frequency resources occupied by the first signal in the first carrier; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the first communication device 450 comprises a memory that stores a computer readable instruction program. The computer readable instruction program generates an action when executed by at least one processor. The action includes: receiving first information, the first information being used for determining a target carrier; detecting a first signaling in a first candidate resource set; and when the first signaling is detected, receiving a first signal in a first carrier, and the first signaling being used for determining time-frequency resources occupied by the first signal in the first carrier; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the first communication device 450 comprises a memory that stores a computer readable instruction program. The computer readable instruction program generates an action when executed by at least one processor. The action includes: receiving first information, the first information being used for determining a target carrier; detecting a first signaling in a first candidate resource set; and when the first signaling is detected, transmitting a first signal in a first carrier, and the first signaling being used for determining time-frequency resources occupied by the first signal in the first carrier; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits first information, the first information being used for determining a target carrier; transmits a first signaling in a first candidate resource set; and transmits a first signal in a first carrier, and the first signaling is used for determining time-frequency resources occupied by the first signal in the first carrier; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits first information, the first information being used for determining a target carrier; transmits a first signaling in a first candidate resource set; and receives a first signal in a first carrier, and the first signaling is used for determining time-frequency resources occupied by the first signal in the first carrier; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the second communication device 410 comprises a memory that stores a computer readable instruction program. The computer readable instruction program generates an action when executed by at least one processor. The action includes: transmitting first information, the first information being used for determining a target carrier; transmitting a first signaling in a first candidate resource set; and transmitting a first signal in a first carrier, and the first signaling being used for determining time-frequency resources occupied by the first signal in the first carrier; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the second communication device 410 comprises a memory that stores a computer readable instruction program. The computer readable instruction program generates an action when executed by at least one processor. The action includes: transmitting first information, the first information being used for determining a target carrier; transmitting a first signaling in a first candidate resource set; and receiving a first signal in a first carrier, and the first signaling being used for determining time-frequency resources occupied by the first signal in the first carrier; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a terminal.

In one embodiment, the second communication device 410 is a base station.

In one embodiment, at least first four of the antenna 452, the receiver 454, the multi-antenna receiving processor 458, the receiving processor 456 and the controller/processor 459 are used to receive first information; and at least first four of the antenna 420, the transmitter 418, the multi-antenna transmitting processor 471, the transmitting processor 416 and the controller/processor 475 are used to transmit first information.

In one embodiment, at least first four of the antenna 452, the receiver 454, the multi-antenna receiving processor 458, the receiving processor 456 and the controller/processor 459 are used to detect a first signaling in a first candidate resource set; and at least first four of the antenna 420, the transmitter 418, the multi-antenna transmitting processor 471, the transmitting processor 416 and the controller/processor 475 are used to transmit a first signaling in a first candidate resource set.

In one embodiment, at least first four of the antenna 452, the receiver 454, the multi-antenna receiving processor 458, the receiving processor 456 and the controller/processor 459 are used to receive a first signal in the first carrier; and at least first four of the antenna 420, the transmitter 418, the multi-antenna transmitting processor 471, the transmitting processor 416 and the controller/processor 475 are used to transmit a first signal in the first carrier.

In one embodiment, at least first four of the antenna 452, the transmitter 454, the multi-antenna transmitting processor 457, the transmitting processor 468, and the controller/processor 459 are used to transmit a first signal in the first carrier; and at least first four of the antenna 420, the receiver 418, the multi-antenna receiving processor 472, the receiving processor 470 and the controller/processor 475 are used to receive a first signal in the first carrier.

In one embodiment, at least first four of the antenna 452, the receiver 454, the multi-antenna receiving processor 458, the receiving processor 456 and the controller/processor 459 are used to receive second information; and at least first four of the antenna 420, the transmitter 418, the multi-antenna transmitting processor 471, the transmitting processor 416 and the controller/processor 475 are used to transmit second information.

In one embodiment, at least first four of the antenna 452, the receiver 454, the multi-antenna receiving processor 458, the receiving processor 456 and the controller/processor 459 are used to receive third information; and at least first four of the antenna 420, the transmitter 418, the multi-antenna transmitting processor 471, the transmitting processor 416 and the controller/processor 475 are used to transmit third information.

Embodiment 5

Figure 5:
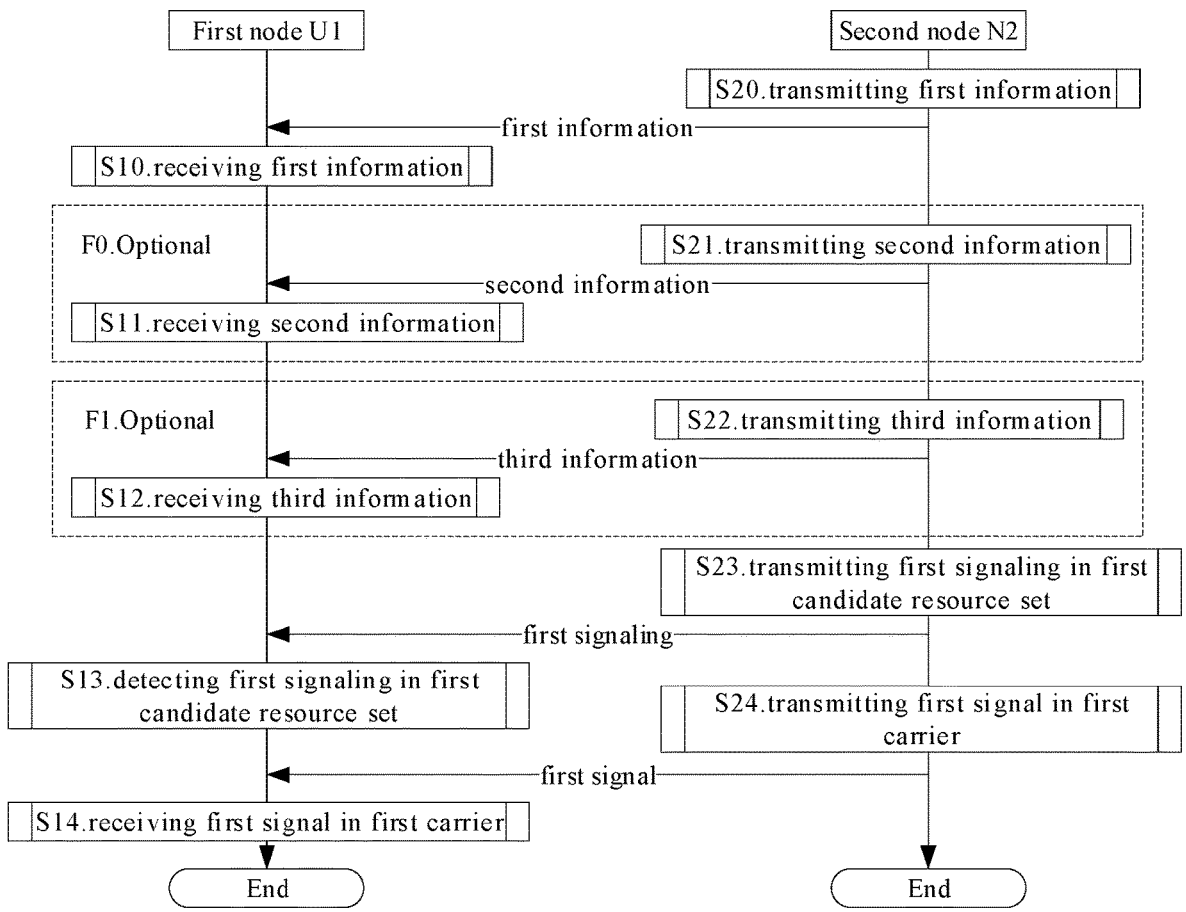
FIG. 5 illustrates a flowchart of a first signal according to one embodiment of the present disclosure.

Embodiment 5 illustrates a flowchart of a first signal, as shown in FIG. 5. In FIG. 5, a first node U1 and a second node N2 are in communication via a radio link. Steps in boxes marked by F0 and F1 are optional.

The first node U1 receives first information in step S10; receives second information in step S11; receives third information in step S12; detects a first signaling in a first candidate resource set in step S13; and receives a first signal in a first carrier in step S14.

The second node N2 transmits first information in step S20; transmits second information in step S21; transmits third information in step S22; transmits a first signaling in a first candidate resource set in step S23; and transmits a first signal in a first carrier in step S24.

In Embodiment 5, the first information is used for determining a target carrier; when the first signaling is detected, the first node U1 receives a first signal in a first carrier, and the first signaling is used for determining time-frequency resources occupied by the first signal in the first carrier; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers; the second information is used for indicating a first integer and a second integer; the first integer and the second integer are respectively associated with the first time-frequency-resource pool and the second time-frequency-resource pool; the third information is used for determining the target time-frequency-resource pool and a number of candidate resource group(s) comprised in the first candidate resource set.

In one embodiment, the second information is carried by an RRC signaling.

In one embodiment, the second information is carried by a higher layer signaling.

In one embodiment, the first integer is configured information specific to a CORESET.

In one embodiment, the second integer is configured information specific to a CORESET.

In one embodiment, the first time-frequency-resource pool and the second time-frequency-resource pool respectively belong to a first slot set and a second slot set, the first slot set comprises M1 slots, the second slot set comprises M2 slots, M1 is a positive integer greater than 1, and M2 is a positive integer greater than 1, any of the M1 slots and any of the M2 slots are orthogonal in time domain.

In one embodiment, the first time-frequency-resource pool and the second time-frequency-resource pool respectively belong to a first sub-carrier set and a second sub-carrier set, the first sub-carrier set comprises M3 sub-carriers, the second sub-carrier set comprises M4 sub-carriers, M3 is a positive integer greater than 1, M4 is a positive integer greater than 1, any of the M3 sub-carriers and any of the M4 sub-carriers are orthogonal in frequency domain.

In one subembodiment of the above embodiment, the target carrier is an SCC, and the target carrier can be used for scheduling a PCC.

In one subembodiment of the above embodiment, the target carrier can schedule a PCC and an SCC simultaneously.

In one subembodiment of the above embodiment, the target carrier can only be self-scheduled.

In one subembodiment of the above embodiment, the target carrier can be cross-carrier scheduled by an SCC.

In one embodiment, time-frequency resources occupied by the first time-frequency-resource pool and time-frequency resources occupied by the second time-frequency-resource pool are orthogonal.

In one subembodiment of the above embodiment, the phrase that time-frequency resources occupied by the first time-frequency-resource pool and time-frequency resources occupied by the second time-frequency-resource pool are orthogonal comprises that: there exists no RE belongs to the first time-frequency-resource pool and the second time-frequency-resource pool simultaneously.

In one embodiment, the second information and the first information belong to two different fields in a signaling.

In one subembodiment of the above embodiment, the first information and the second information are configured by an RRC signaling.

In one subembodiment of the above embodiment, the first information and the second information are two fields in an RRC signaling.

In one embodiment, frequency-domain resources occupied by a signal carrying the first information belong to a second carrier, the first information is used for determining a first index, the first index being an index of the target carrier, the first information is used for determining that the target carrier is different from the second carrier, and the target carrier cross-carrier schedules the second carrier.

In one subembodiment of the above embodiment, the second carrier is a PCC.

In one subembodiment of the above embodiment, the second carrier is a carrier occupied by a PCell.

In one subembodiment of the above embodiment, the second carrier is the first carrier.

In one embodiment, the third information is configured by an RRC signaling.

In one embodiment, the target time-frequency-resource pool comprises P1 candidate resource groups, the first candidate resource set comprises P2 candidate resource groups, P1 is a positive integer greater than 1, P2 is a positive integer greater than 1, and the third information is used for indicating the P1 and the P2.

In one embodiment, the first signaling is a DL grant, and a physical layer channel carrying the first signal is a PDSCH.

Embodiment 6

Figure 6:
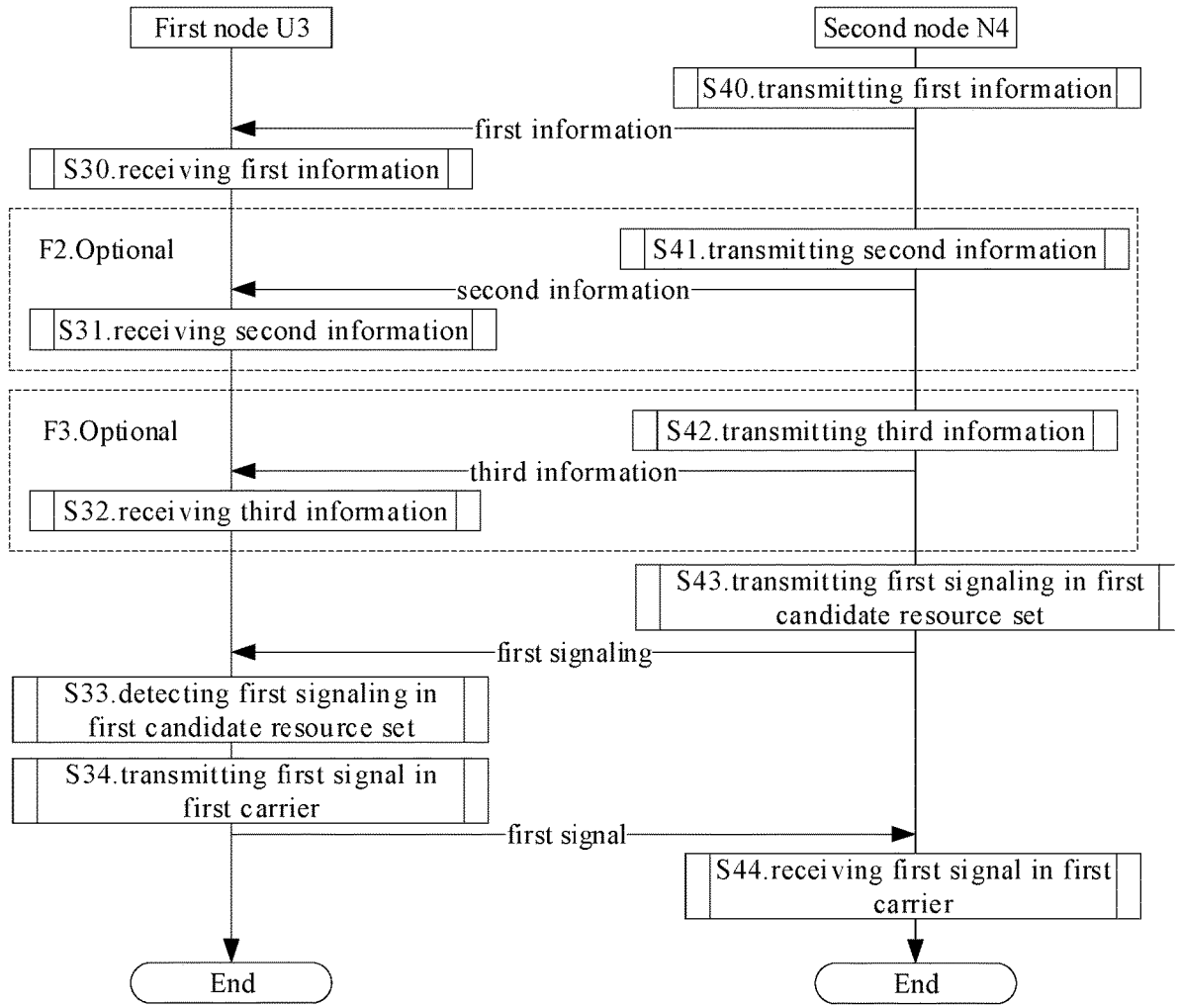
FIG. 6 illustrates a flowchart of a first signal according to another embodiment of the present disclosure.

Embodiment 6 illustrates another flowchart of a first signal, as shown in FIG. 6. In FIG. 6, a first node U3 and a second node N4 are in communication via a radio link. Steps in boxes marked by F2 and F3 are optional. Embodiments and sub-embodiments in the Embodiment 5 can be applied to Embodiment 6 if no conflict is incurred.

The first node U3 receives first information in step S30; receives second information in step S31; receives third information in step S32; detects a first signaling in a first candidate resource set in step S33; and transmits a first signal in a first carrier in step S34.

The second node N4 transmits first information in step S40; transmits second information in step S41; transmits third information in step S42; transmits a first signaling in a first candidate resource set in step S43; and receives a first signal in a first carrier in step S44.

In Embodiment 6, the first information is used for determining a target carrier; when the first signaling is detected, the first node U3 transmits a first signal in a first carrier, and the first signaling is used for determining time-frequency resources occupied by the first signal in the first carrier; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers; the second information is used for indicating a first integer and a second integer; the first integer and the second integer are respectively associated with the first time-frequency-resource pool and the second time-frequency-resource pool; the third information is used for determining the target time-frequency-resource pool and a number of candidate resource group(s) comprised in the first candidate resource set.

In one embodiment, the first signaling is a UL grant, and a physical layer channel carrying the first signal is a PUSCH.

Embodiment 7

Figure 7:
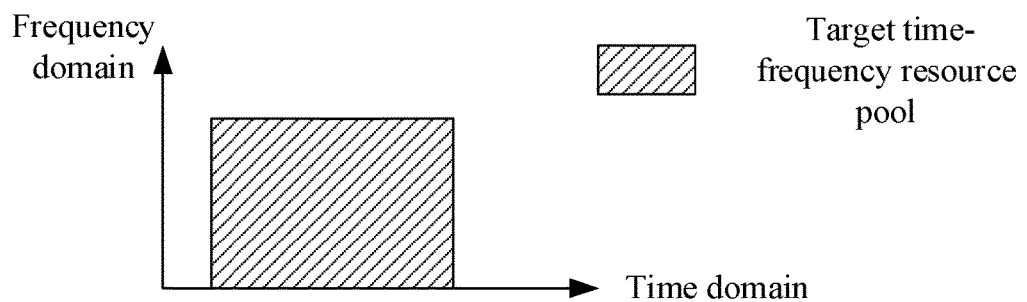
FIG. 7 illustrates a schematic diagram of a target time-frequency-resource pool according to one embodiment of the present disclosure.

Embodiment 7 illustrates a schematic diagram of a target time-frequency-resource pool, as shown in FIG. 7. In FIG. 7, the target time-frequency-resource pool occupies a positive integer number of sub-carrier(s) in frequency domain, and the target time-frequency-resource pool occupies a positive integer number of multi-carrier symbol(s) in time domain.

In one embodiment, the target time-frequency-resource pool occupies frequency bandwidth(s) corresponding to a positive integer number of Physical Resource Block(s) in frequency domain.

In one embodiment, the multi-carrier symbol in the present disclosure is an Orthogonal Frequency Division Multiplexing (OFDM) symbol.

In one embodiment, the multi-carrier symbol in the present disclosure is a Single Carrier-Frequency Division Multiple Access (SC-FDMA) symbol.

In one embodiment, the multi-carrier symbol in the present disclosure is a Filter Bank Multi Carrier (FBMC) symbol.

In one embodiment, the multi-carrier symbol in the present disclosure is an PFDM symbol that comprises a Cyclic Prefix (CP).

In one embodiment, the multi-carrier symbol in the present disclosure is a Discrete Fourier Transform Spreading Orthogonal Frequency Division Multiplexing (DFT-s-OFDM) symbol that comprises a CP.

Embodiment 8

Figure 8:
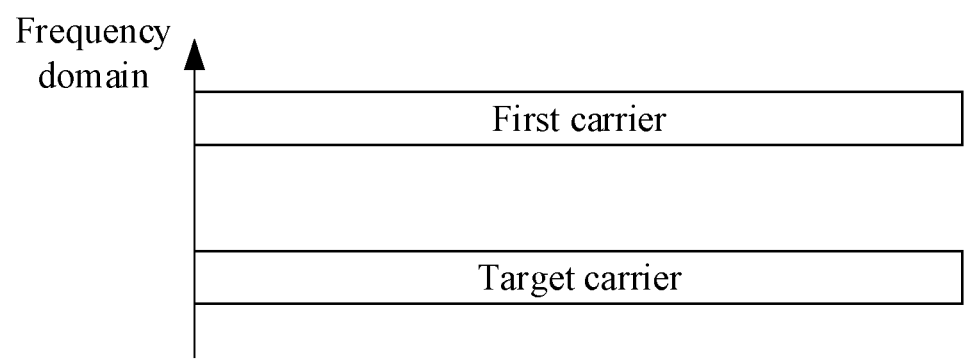
FIG. 8 illustrates a schematic diagram of a target carrier and a first carrier according to one embodiment of the present disclosure.

Embodiment 8 illustrates a schematic diagram of a target carrier and a first carrier according to the present disclosure, as shown in FIG. 8. In FIG. 8, the target carrier and the first carrier are orthogonal.

In one embodiment, the target carrier is an SCC.
In one embodiment, the first carrier is a PCC.
In one embodiment, the target carrier is an LTE carrier.
In one embodiment, the first carrier is an NR carrier.
In one embodiment, a ServCellId corresponding to the target carrier is equal to 1.
In one embodiment, a ServCellId corresponding to the first carrier is equal to 0.
In one embodiment, a ServCellIndex corresponding to the target carrier is equal to 1.
In one embodiment, a ServCellIndex corresponding to the first carrier is equal to 0.

Embodiment 9

Figure 9:
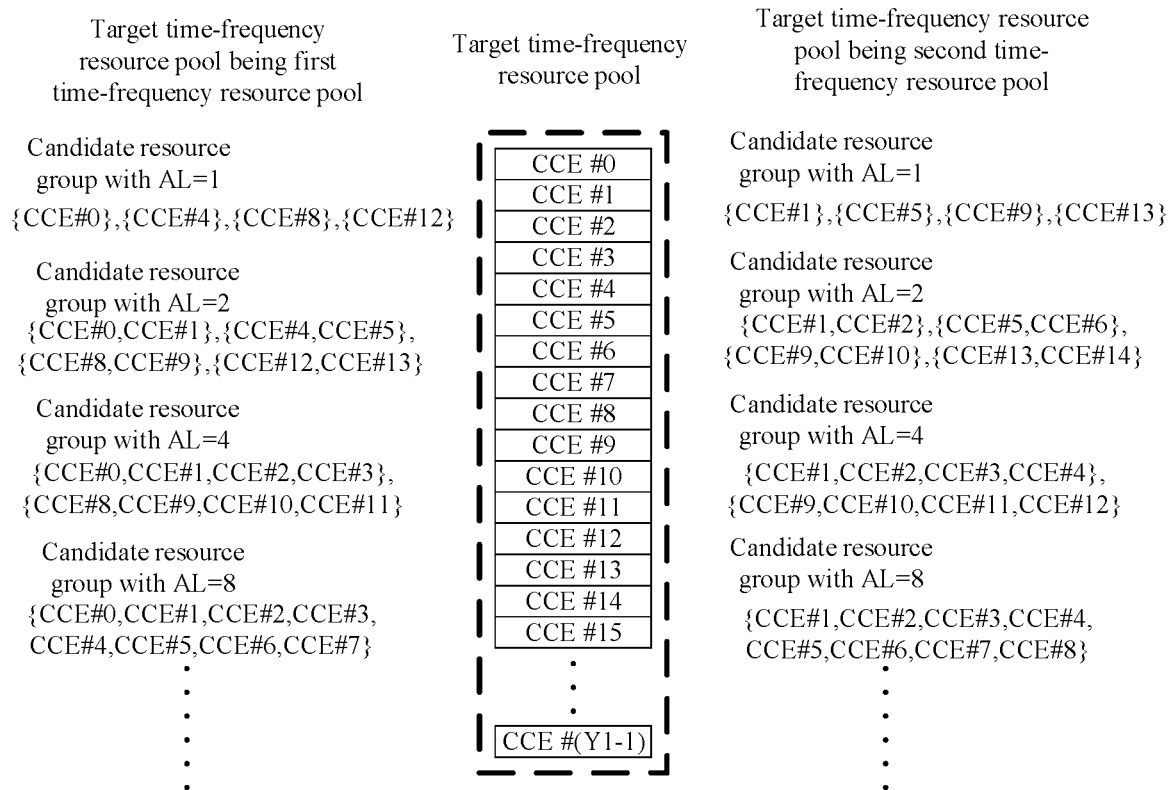
FIG. 9 illustrates a schematic diagram of a first candidate resource set according to one embodiment of the present disclosure.

Embodiment 9 illustrates a schematic diagram of a first candidate resource set according to the present disclosure, as shown in FIG. 9. In FIG. 9, a target time-frequency-resource pool in the present disclosure (as shown in the dotted box in the figure) comprises Y1 CCEs, Y1 being a positive integer greater than 1. One or more CCEs in the Y1 CCEs (respectively corresponding to CCE #0 to CCE #(Y1-1) in the figure) consist a candidate resource group comprised in the first candidate resource set in the present disclosure; sequence numbers of CCEs corresponding to candidate resource groups in the figure are sequence numbers of CCEs comprised in the candidate resource groups with different aggregation levels; CCE sequence number identifiers listed in braces in the figure consist of CCEs in a candidate resource group.

As shown in the figure, the left side illustrates K1 types of CCE combinations corresponding to the K1 candidate resource groups when the target time-frequency-resource pool is the first time-frequency-resource pool in the present disclosure; and the right side illustrates K1 types of CCE combinations corresponding to the K1 candidate resource groups when the target time-frequency-resource pool is the second time-frequency-resource pool in the present disclosure.

Embodiment 10

Figure 10:
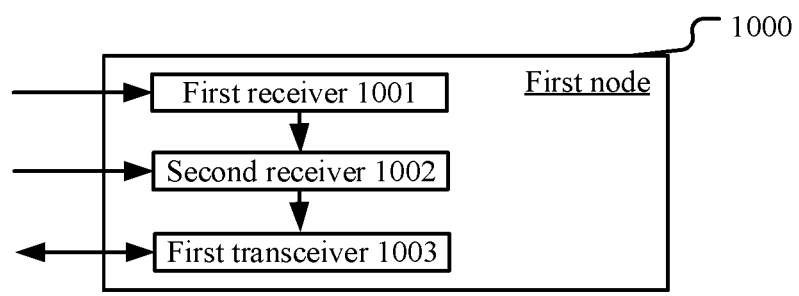
FIG. 10 illustrates a structure block diagram in a first node according to one embodiment of the present disclosure.

Embodiment 10 illustrates a structure block diagram in a first node, as shown in FIG. 10. In FIG. 10, the first node 1001 comprises a first receiver 1001, a second receiver 1002 and a first transceiver 1003.

The first receiver 1001, receives first information, and the first information is used for determining a target carrier;
a second receiver 1002, detects a first signaling in a first candidate resource set; and
a first transceiver 1003, when the first signaling is detected, operates a first signal in a first carrier, and the first signaling is used for determining time-frequency resources occupied by the first signal in the first carrier;
in Embodiment 10, the operating action is receiving, or, the operating action is transmitting; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the first receiver 1001 receives second information; the second information is used for indicating a first integer and a second integer; the first integer and the second integer are respectively associated with the first time-frequency-resource pool and the second time-frequency-resource pool.

In one embodiment, the target carrier is an SCC, and the target carrier can be used for scheduling a PCC.

In one embodiment, time-frequency resources occupied by the first time-frequency-resource pool and time-frequency resources occupied by the second time-frequency-resource pool are orthogonal.

In one embodiment, the second information and the first information belong to two different fields in a signaling.

In one embodiment, frequency-domain resources occupied by a signal carrying the first information belong to a second carrier, the first information is used for determining a first index, the first index being an index of the target carrier, the first information is used for determining that the target carrier is different from the second carrier, and the target carrier cross-carrier schedules the second carrier.

In one embodiment, the first receiver 1001 receives third information; the third information is used for determining the target time-frequency-resource pool and a number of candidate resource group(s) comprised in the first candidate resource set.

In one embodiment, the first receiver 1001 comprises at least first four of the antenna 452, the receiver 454, the multi-antenna receiving processor 458, the receiving processor 456 and the controller/processor 459 in Embodiment 4.

In one embodiment, the second receiver 1002 comprises at least first four of the antenna 452, the receiver 454, the multi-antenna receiving processor 458, the receiving processor 456 and the controller/processor 459 in Embodiment 4.

In one embodiment, the first transceiver 1003 comprises at least first six of the antenna 452, the receiver 454, the multi-antenna receiving processor 458, the receiving processor 456, the transmitter 454, the multi-antenna transmitting processor 457, the transmitting processor 468, and the controller/processor 459 in Embodiment 4.

Embodiment 11

Figures 11, 12:
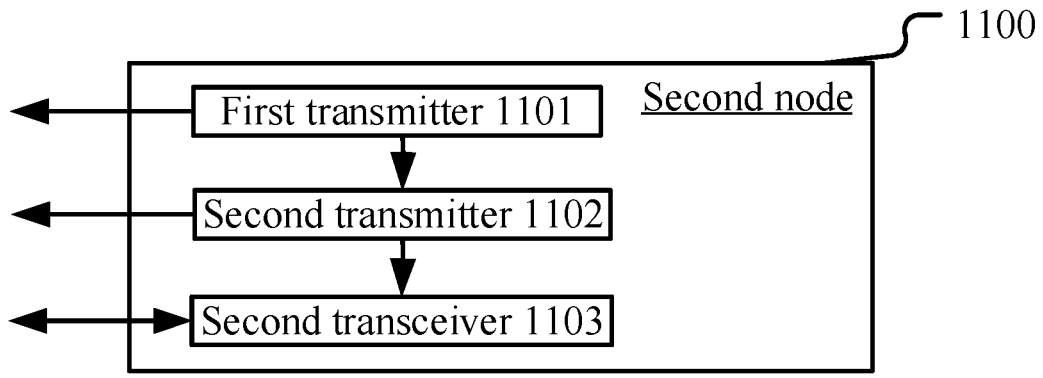
FIG. 11 illustrates a structure block diagram in a second node according to one embodiment of the present disclosure.
FIG. 12 illustrates a schematic diagram of second information according to one embodiment of the present disclosure.

Embodiment 11 illustrates a structure block diagram of in a second node, as shown in FIG. 11. In FIG. 11, a second node 1100 comprises a first transmitter 1101, a second transmitter 1102 and a second transceiver 1103.

The first transmitter 1101, transmits first information, and the first information is used for determining a target carrier;
the second transmitter 1102, transmits a first signaling in a first candidate resource set; and
the second transceiver 1103, executes a first signal in a first carrier, and the first signaling is used for determining time-frequency resources occupied by the first signal in the first carrier;
in Embodiment 11, the executing action is transmitting, or the executing action is receiving; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers.

In one embodiment, the first transmitter 1101 transmits second information; the second information is used for indicating a first integer and a second integer; the first integer and the second integer are respectively associated with the first time-frequency-resource pool and the second time-frequency-resource pool.

In one embodiment, the target carrier is an SCC, and the target carrier can be used for scheduling a PCC.

In one embodiment, time-frequency resources occupied by the first time-frequency-resource pool and time-frequency resources occupied by the second time-frequency-resource pool are orthogonal.

In one embodiment, the second information and the first information belong to two different fields in a signaling.

In one embodiment, frequency-domain resources occupied by a signal carrying the first information belong to a second carrier, the first information is used for determining a first index, the first index being an index of the target carrier, the first information is used for determining that the target carrier is different from the second carrier, and the target carrier cross-carrier schedules the second carrier.

In one embodiment, the first transmitter 1101 transmits third information; the third information is used for determining the target time-frequency-resource pool and a number of candidate resource group(s) comprised in the first candidate resource set.

In one embodiment, the first transmitter 1101 comprises at least first four of the antenna 420, the transmitter 418, the multi-antenna transmitting processor 471, the transmitting processor 416 and the controller/processor 475 in Embodiment 4.

In one embodiment, the second transmitter 1102 comprises at least first four of the antenna 420, the transmitter 418, the multi-antenna transmitting processor 471, the transmitting processor 416 and the controller/processor 475 in Embodiment 4.

In one embodiment, the second transceiver 1103 comprises at least first six of the antenna 420, the transmitter 418, the multi-antenna transmitting processor 471, the transmitting processor 416, the receiver 418, the multi-antenna receiving processor 472, the receiving processor 470, and the controller/processor 475 in Embodiment 4.

Embodiment 12

Embodiment 12 illustrates a schematic diagram of second information according to one embodiment of the present disclosure, as shown in FIG. 12. In FIG. 12, the second information is CrossCarrierSchedulingConfig in Technical Specification (TS) 38.331, as shown in the figure, the second information is used for configuring information of the first carrier. The first carrier comprises a scheduling CIF corresponding to a cif-InSchedulingCell in the figure used for determining the first carrier out of multiple carriers; and the first carrier comprises two search space CIFs respectively corresponding to cif-searchspace1 and cif-searchspace2 in the figure, the cif-searchspace1 corresponds to ControlResourceSetId-A, and the cif-searchspace2 corresponds to ControlResourceSetId-B; the ControlResourceSetId-A is an identifier of a first time-frequency-resource pool in the present disclosure, and the ControlResourceSetId-B is an identifier of a second time-frequency-resource pool in the present disclosure; when the target time-frequency-resource pool is the first time-frequency-resource pool, the cif-searchspace1 is used for determining the first candidate resource set out of the target time-frequency-resource pool; and when the target time-frequency-resource pool is the second time-frequency-resource pool, the cif-searchspace2 is used for determining the first candidate resource set out of the target time-frequency-resource pool.

In one embodiment, a value of the cif-searchspace1 is the first integer in the present disclosure.

In one embodiment, a value of the cif-searchspace2 is the second integer in the present disclosure.

In one embodiment, the ServCellIndex is used for identifying the target carrier.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The first node and the second node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The base station in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations, RSUs and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving first information, the first information being used for determining a target carrier;
a second receiver, detecting a first signaling in a first candidate resource set; and
a first transceiver, when the first signaling is detected, operating a first signal in a first carrier, and the first signaling being used for determining time-frequency resources occupied by the first signal in the first carrier;
wherein the operating action is receiving, or, the operating action is transmitting; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers; the target time-frequency-resource pool is a Control Resource Set (CORESET); the first time-frequency-resource pool is a CORESET; the second time-frequency-resource pool is a CORESET; a physical layer channel carrying the first signaling is a PDCCH; the first signaling is a DL Grant and the operating action is receiving, or the first signaling is a UL Grant, and the operating action is transmitting.

2. The first node according to claim 1, wherein the first receiver receives second information; the second information is used for indicating the first integer and the second integer; the first integer and the second integer are respectively associated with the first time-frequency-resource pool and the second time-frequency-resource pool.

3. The first node according to claim 1, wherein the target carrier is a Secondary Component Carrier (SCC), and the target carrier can be used for scheduling a Primary Component Carrier (PCC).

4. The first node according to claim 1, wherein time-frequency resources occupied by the first time-frequency-resource pool and time-frequency resources occupied by the second time-frequency-resource pool are orthogonal.

5. The first node according to claim 2, wherein the second information and the first information belong to two different fields in one signaling.

6. The first node according to claim 1, wherein frequency-domain resources occupied by a signal carrying the first information belong to a second carrier, the first information is used for determining a first index, the first index being an index of the target carrier, the first information is used for determining that the target carrier is different from the second carrier, and the target carrier cross-carrier schedules the second carrier.

7. The first node according to claim 1, wherein the first receiver receives third information; the third information is used for determining the target time-frequency-resource pool and a number of candidate resource group(s) comprised in the first candidate resource set.

8. The first node according to claim 1, wherein the first candidate resource set comprises K1 candidate resource groups, any of the K1 candidate resource groups occupies a positive integer number of CCE(s), and the target identifier is used for determining position(s) of a positive integer number of CCE(s) occupied by any of the K1 candidate resource groups out of the target time-frequency-resource pool;
Wherein, K1 is a positive integer.

9. The first node according to claim 1, wherein a carrier occupied by a Primary Cell (PCell) of the first node is the first carrier, and the target carrier corresponds to a Secondary Cell (SCell) of the first node.

10. The first node according to claim 1, wherein the first carrier is equal to the target carrier, the first integer is equal to 0, and the second integer is greater than 0.

11. The first node according to claim 1, wherein a ServCellId employed by the first carrier is equal to 0, and a ServCellId employed by the target carrier is greater than 0.

12. The first node according to claim 1, wherein the target time-frequency-resource pool is the same as the first time-frequency-resource pool, the target identifier is equal to the first integer; or the target time-frequency-resource pool is the same as the second time-frequency-resource pool, the target identifier is equal to the second integer.

13. The first node according to any of claim 1, wherein the first time-frequency-resource pool and the second time-frequency-resource pool respectively belong to a first slot set and a second slot set, the first slot set comprises M1 slots, the second slot set comprises M2 slots, M1 is a positive integer greater than 1, and M2 is a positive integer greater than 1, any of the M1 slots and any of the M2 slots are orthogonal in time domain.

14. The first node according to any of claim 1, wherein the first time-frequency-resource pool and the second time-frequency-resource pool respectively belong to a first sub-carrier set and a second sub-carrier set, the first sub-carrier set comprises M3 sub-carriers, the second sub-carrier set comprises M4 sub-carriers, M3 is a positive integer greater than 1, M4 is a positive integer greater than 1, and any of the M3 sub-carriers and any of the M4 sub-carriers are orthogonal in frequency domain.

15. The first node according to any of claim 1, wherein the first integer is configured information specific to a CORESET, and the second integer is configured information specific to a CORESET.

16. The first node according to any of claim 1, wherein the target carrier is an SCC, and the target carrier can schedule a PCC and an SCC simultaneously.

17. A method in a first node for wireless communications, comprising:
receiving first information, the first information being used for determining a target carrier;
detecting a first signaling in a first candidate resource set; and
when the first signaling is detected, operating a first signal in a first carrier, and the first signaling being used for determining time-frequency resources occupied by the first signal in the first carrier;
wherein the operating action is receiving, or, the operating action is transmitting; the first signaling carries a first identifier, and the first identifier is used for identifying the first carrier; the first candidate resource set comprises a positive integer number of candidate resource group(s), and the first signaling occupies a candidate resource group in the first candidate resource set; any candidate resource group in the first candidate resource set belongs to a target time-frequency-resource pool, and the target time-frequency-resource pool comprises time-frequency resources other than a candidate resource group comprised in the first candidate resource set; frequency-domain resources occupied by the target time-frequency-resource pool belong to the target carrier; a target identifier is a non-negative integer, which is used for determining the first candidate resource set out of the target time-frequency-resource pool; the target time-frequency-resource pool is one of a first time-frequency-resource pool or a second time-frequency-resource pool; whether the target time-frequency-resource pool is the same as the first time-frequency-resource pool is used for determining the target identifier out of a first integer and a second integer; the first integer is not equal to the second integer, and the first integer and the second integer are both non-negative integers; the target time-frequency-resource pool is a Control Resource Set (CORESET); the first time-frequency-resource pool is a CORESET; the second time-frequency-resource pool is a CORESET; a physical layer channel carrying the first signaling is a PDCCH; the first signaling is a DL Grant and the operating action is receiving, or the first signaling is a UL Grant, and the operating action is transmitting.

18. The method in a first node according to claim 17, wherein time-frequency resources occupied by the first time-frequency-resource pool and time-frequency resources occupied by the second time-frequency-resource pool are orthogonal.

* * * * *